(12) United States Patent
Hara (10) Patent No.: US 6,684,619 B2
(45) Date of Patent: Feb. 3, 2004

(54) FENCE CHAIN INDICATOR (76) Inventor: Yutaka Hara, 6-2-12, 6-jo, Suehiro, Asahikawa-shi, Hokkaido (JP)

( * ) Notice: Subject to any disclaimer, the term of this patent is extended or adjusted under 35 U.S.C. 154(b) by 0 days.

(21) Appl. No.: 10/307,980

(22) Filed: Dec. 3, 2002

(65) Prior Publication Data
US 2003/0110757 A1 Jun. 19, 2003

(30) Foreign Application Priority Data
Dec. 3, 2001 (JP) ........................................ 2001-368804

(51) Int. Cl.⁷ .......................... F16G 15/04; F16G 13/18
(52) U.S. Cl. .................................. 59/93; 59/78; 59/92
(58) Field of Search ............................. 59/78, 85, 92, 59/93, 3

(56) References Cited

U.S. PATENT DOCUMENTS

| | | | | |
|---|---|---|---|---|
| 1,114,289 A | * | 10/1914 | Rittenhouse | 59/85 |
| 5,331,802 A | * | 7/1994 | Varley | 59/85 |
| 5,601,326 A | * | 2/1997 | Smetz | 59/93 |
| 6,282,879 B1 | * | 9/2001 | Bonaiti et al. | 59/93 |

FOREIGN PATENT DOCUMENTS

JP  2000-182025  * 6/2000

* cited by examiner

Primary Examiner—David B. Jones
(74) Attorney, Agent, or Firm—Oblon, Spivak, McClelland, Maier & Neustadt, P.C.

(57) ABSTRACT

The present invention provides a fence chain indicator enabling a single type of sheet body made of either a luminous material or a luminescent material to be attached to fence chain ring bodies of different dimensions, and also enabling this sheet body to be securely fastened. The fence chain indicator comprises a sheet body 10 which has flexibility, is made from either a luminous material or a luminescent material, and provided with fastening portions 11, 12 which are opened, at the opposite ends thereof, and is constituted such that a fastening member 13, which is provided with engagement grooves 13a for locking, is integrally attached to one end of the above-mentioned sheet body 10; a mating portion 14 is formed in the other end for mating with the above-mentioned fastening member 13; and a through-hole 15 of the above-mentioned fastening member 13 is formed in approximately the center portion of the above-mentioned sheet body 10.

12 Claims, 10 Drawing Sheets

FENCE CHAIN INDICATOR

BACKGROUND OF THE INVENTION

1. Field of the Invention

The present invention relates to a fence chain indicator, which is attached to a fence chain used for the purpose of preventing people and vehicles from trespassing, and clearly makes known the presence thereof at night.

2. Description of the Related Art

A fence chain made from metal or synthetic plastic is generally provided in a tensioned state across roads, at parking areas, construction sites, public parks and so forth as means for safety measures for preventing people and vehicles from trespassing.

However, the problem is that even if the above-mentioned fence chain is readily discernable in the daytime, it is extremely difficult to make the existence of a fence chain discernable in dark locations at night, and at a distance it is impossible to tell a fence chain exists, giving rise to accidents when people, bicycles, and/or automobiles do not notice the fence chain and crash into it.

Accordingly, to solve for this problem, there were means such as those disclosed in Japanese Patent Application Laid-open No. 2000-182025. This invention is constituted such that a luminescent material is attached to the ring bodies of a chain, which is formed by sequentially connecting ring bodies, and this luminescent material is comprised from two luminescent plate-shaped bodies, which are positioned from both sides on the inside of a ring body, and joining means for joining the luminescent plate-shaped bodies, and the luminescent plate-shaped bodies can be fastened to a ring body by joining the luminescent plate shaped bodies together.

However, in the above-described conventional solution means, the two luminescent plate-shaped bodies are rigid bodies, and to manufacture these luminescent plate-shaped bodies requires two forming dies for each. Then, the ring body, to which these two luminescent plate-shaped bodies are fastened, is, of course, officially approved for one type of width dimension only. But ring bodies being marketed come in a variety of types of ring body sizes and width dimensions, and to support a variety of types of ring bodies, a variety of types of luminescent plate-shaped bodies tailored to these dimensions must be prepared, thus giving rise to the problem of extremely high costs for preparing a variety of types of expensive forming dies for this purpose.

Further, the joining together of two luminescent plate-shaped bodies involved pressing a protruding shaft into a circular cylinder, and since there was no locking function, there was also the danger that these luminescent plate-shaped bodies would come off and be carried off.

SUMMARY OF THE INVENTION

In view of the above-mentioned conventional problems, an object of the present invention is to provide a fence chain indicator, which is in the form of a sheet body comprising one type of either a luminous material or a luminescent material, and which can be attached to fence chain ring bodies of sizes and widths of different dimensions, and can be securely fastened as well.

The present invention for achieving the above-mentioned object is characterized in that a fence chain indicator comprises a sheet body which has flexibility and is provided with fastening portions, which are opened, at the opposite ends thereof, and that a fastening member which is provided with engagement grooves for locking, is integrally attached to one end of the sheet body; a mating portion is formed at the other end of the sheet body to mate with the fastening member; and a through-hole for the fastening member is formed in the approximate center portion of the sheet body.

Further, the present invention is characterized in that a fence chain indicator comprises a sheet body which is provided with fastening portions, which are opened, at the opposite ends thereof, and in that: a fastening member which is provided with engagement grooves for locking is integrally attached to, and a mating portion for mating with the fastening member is formed at one end of the sheet body; and a through-hole for the fastening member is formed in the approximate center of the sheet body.

Further, the present invention is characterized in that a fence chain indicator comprises a sheet body which has flexibility and is provided with fastening portions, which are opened, at the opposite ends thereof; and a fastening band having a locking function that is provided separately from the sheet body, and in that an inserting hole for the fastening band is formed in one end of the sheet body; a mating portion for mating with the fastening band is formed in the other end of the sheet body; and a through-hole for the fastening member is formed in the approximate center of the sheet body.

Further, the present invention is characterized in that the openings of the fastening portions are mutually opened in opposite directions.

Further, the present invention is characterized in that a fence chain indicator comprises a sheet body, which has flexibility and is provided with fastening portions, which are opened, at the opposite ends thereof, and in that: a fastening member, which has flexibility and is provided with engagement grooves for locking, is integrally attached to one end of the sheet body; a mating portion for mating to the fastening member is formed at the other end of the sheet body; and the openings of the fastening portions are opened in the same direction.

Further, the present invention is characterized in that a fence chain indicator comprises a sheet body which has flexibility and is provided with fastening portions, which are opened, at the opposite ends thereof; and a fastening band having a locking function that is provided separately from the sheet body, and in that: an inserting portion for the fastening band is formed in one end of the sheet body; a mating portion for mating with the fastening band is formed in the other end of the sheet body; and the openings of the fastening portions are opened in the same direction.

Further, the fence chain indicator of the invention is characterized in that the sheet body is made from either a luminous material or a luminescent material.

Further, the fence chain indicator of the invention is characterized in that the fastening portions provided at the opposite ends are formed in an approximate C shape, and have snap functions.

Further, the fence chain indicator of the invention is characterized in that the fastening portions at the opposite ends are provided with mating portions for mating with the fastening band.

Further, the fence chain indicator of the invention is characterized in that the fastening portions at the opposite ends are provided with inserting portions through which the fastening band passes.

Further, the fence chain indicator of the invention is characterized in that a joining portion is provided in the approximate center of the sheet body, and the sheet body is constituted so as to be able to separate in the vertical direction from the joining portion.

Furthermore, the fence chain indicator of the present invention is characterized in that male mating portions and female mating portions are formed in the above-mentioned joining portion.

DESCRIPTION OF THE PREFERRED EMBODIMENTS

The aspects of the embodiment of a fence chain indicator related to the present invention will be explained in detail hereinbelow by referring to the figures.

Figure 1:
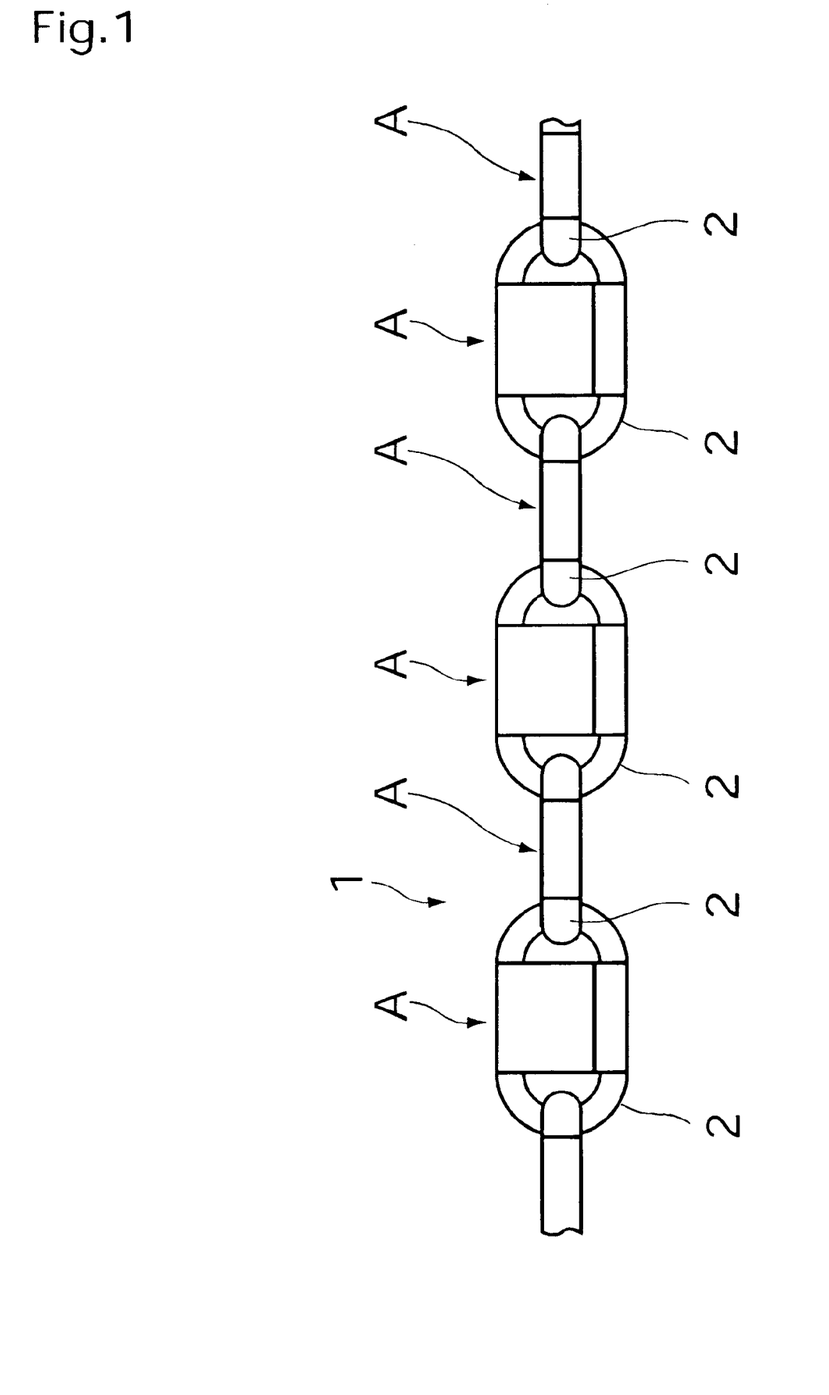
FIG. 1 is a front view showing the state of utilization of a fence chain indicator of the present invention.
Figure 2:
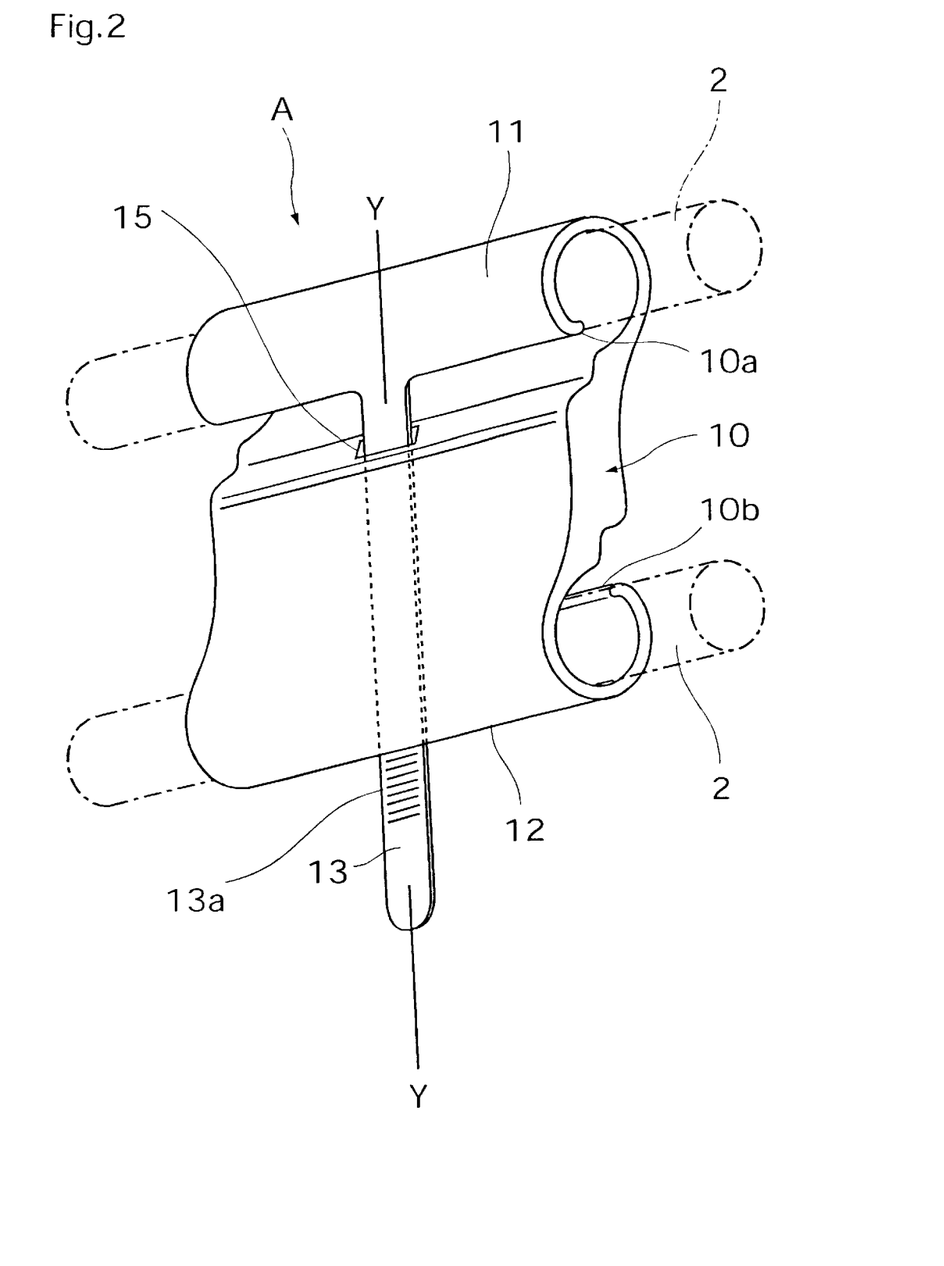
FIG. 2 is a perspective view showing the fence chain indicator of FIG. 1.
Figure 3:
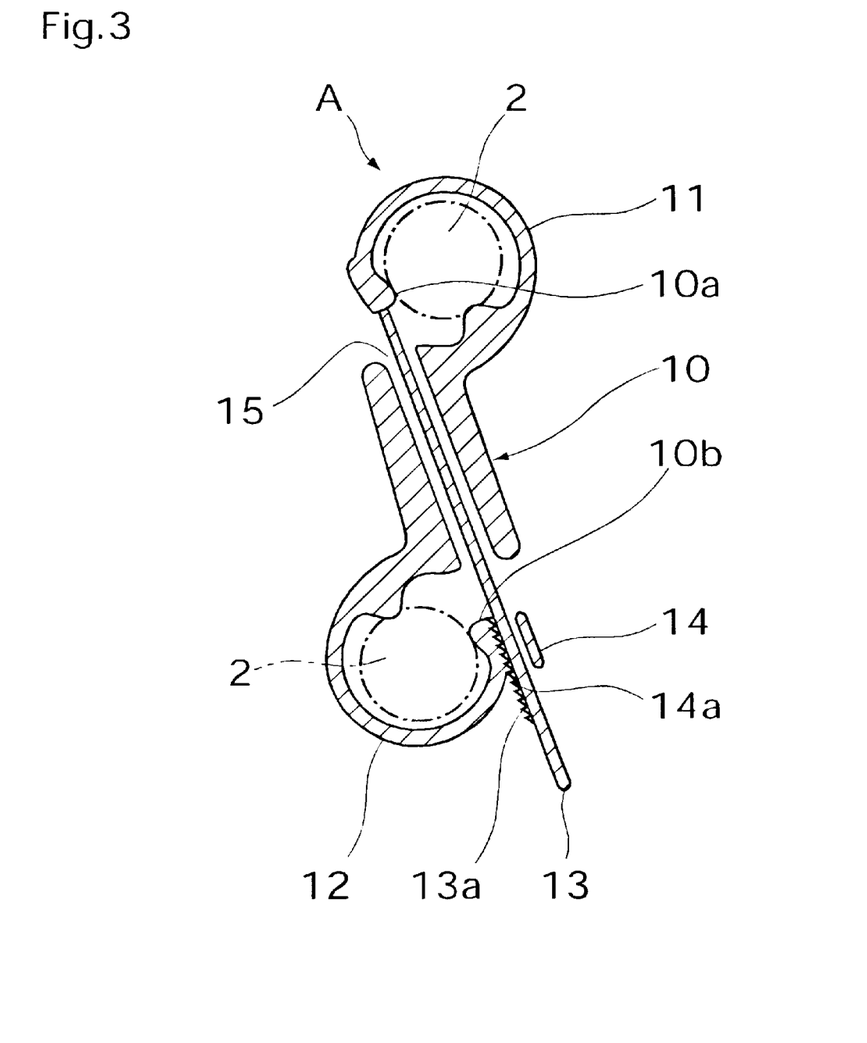
FIG. 3 is a cross-sectional view along Y—Y in FIG. 2.
Figure 4:
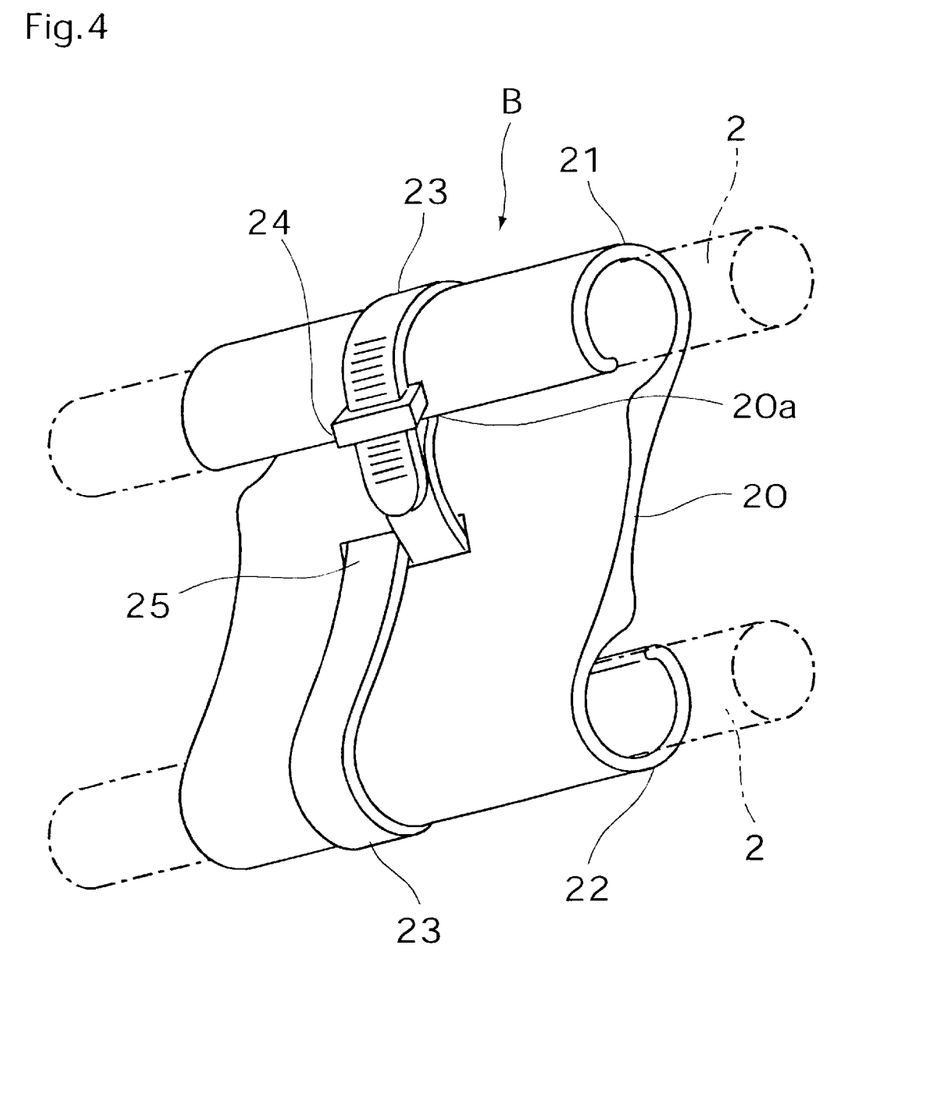
FIG. 4 is a perspective view showing another embodiment of the fence chain indicator.
Figure 5:
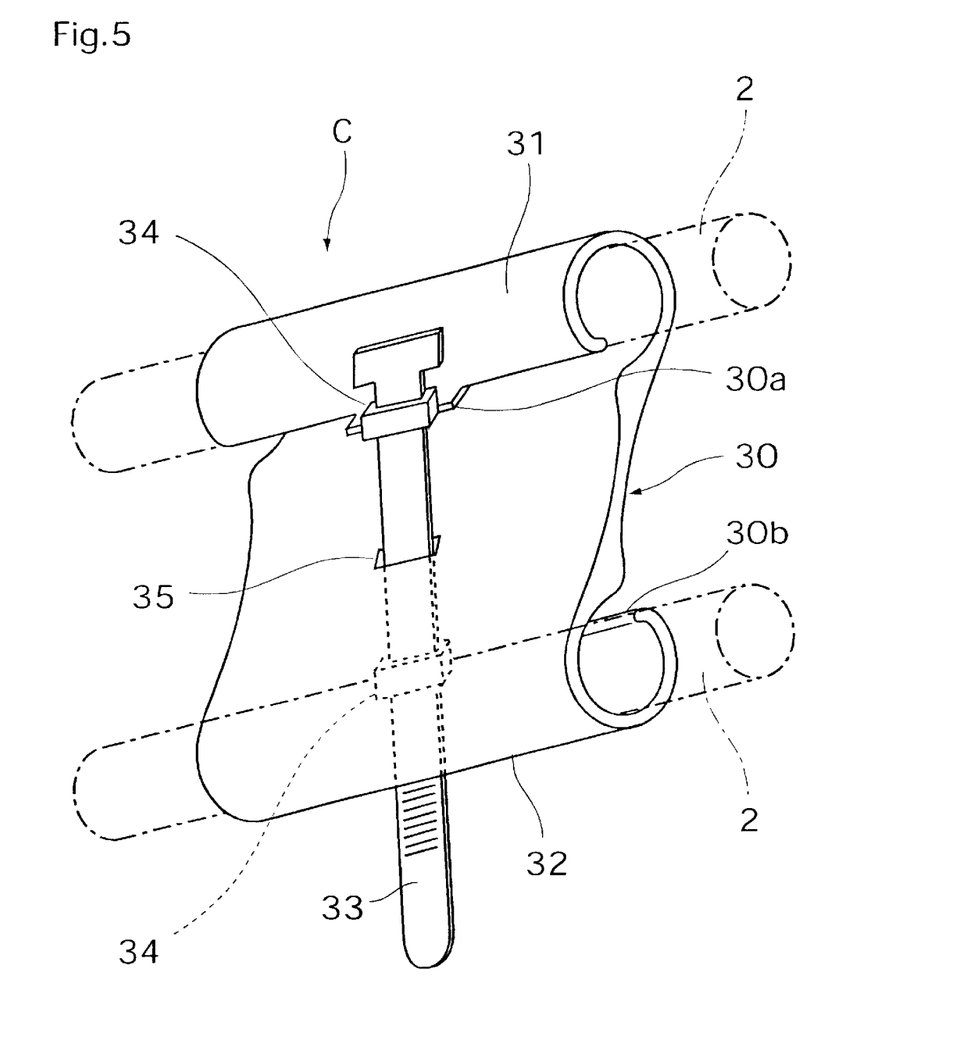
FIG. 5 is a perspective view showing another embodiment of the fence chain indicator.
Figure 6:
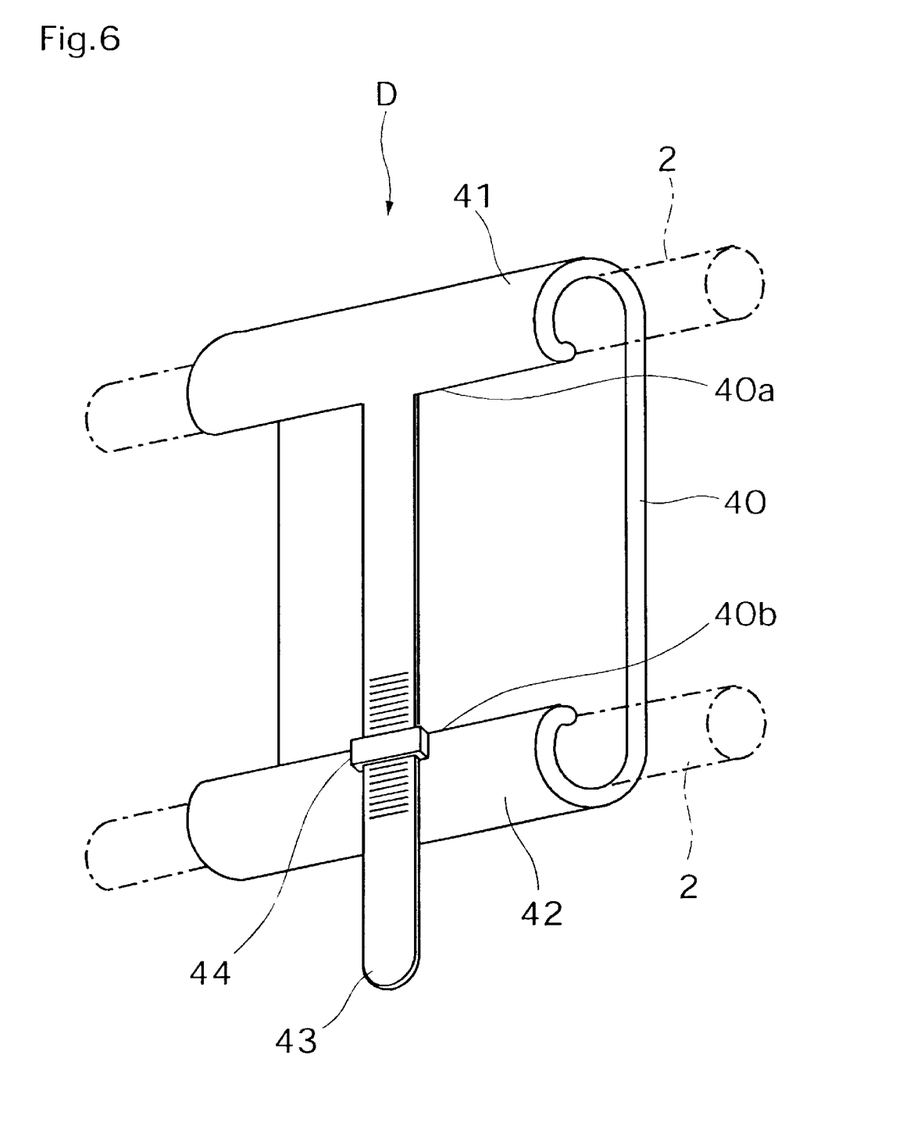
FIG. 6 is a perspective view showing another embodiment of the fence chain indicator.
Figure 7:
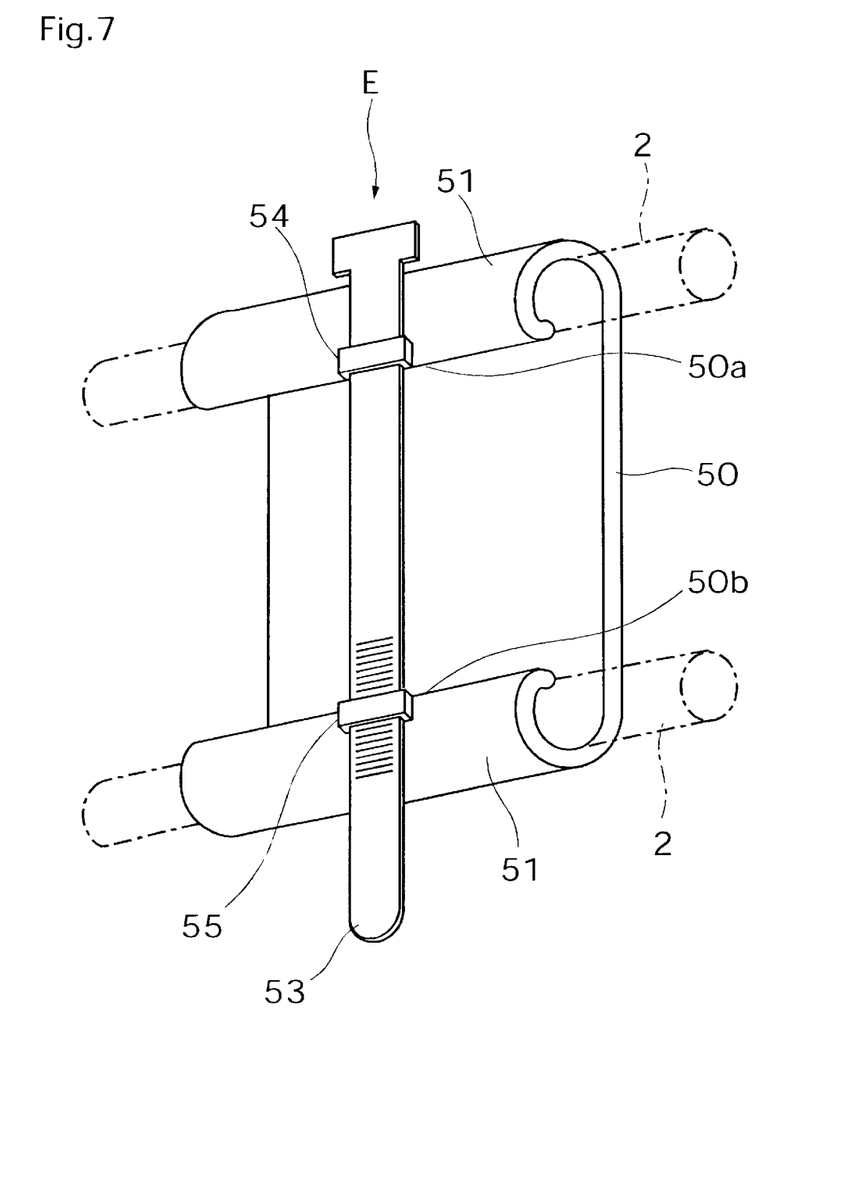
FIG. 7 is a perspective view showing another embodiment of the fence chain indicator.
Figure 8:
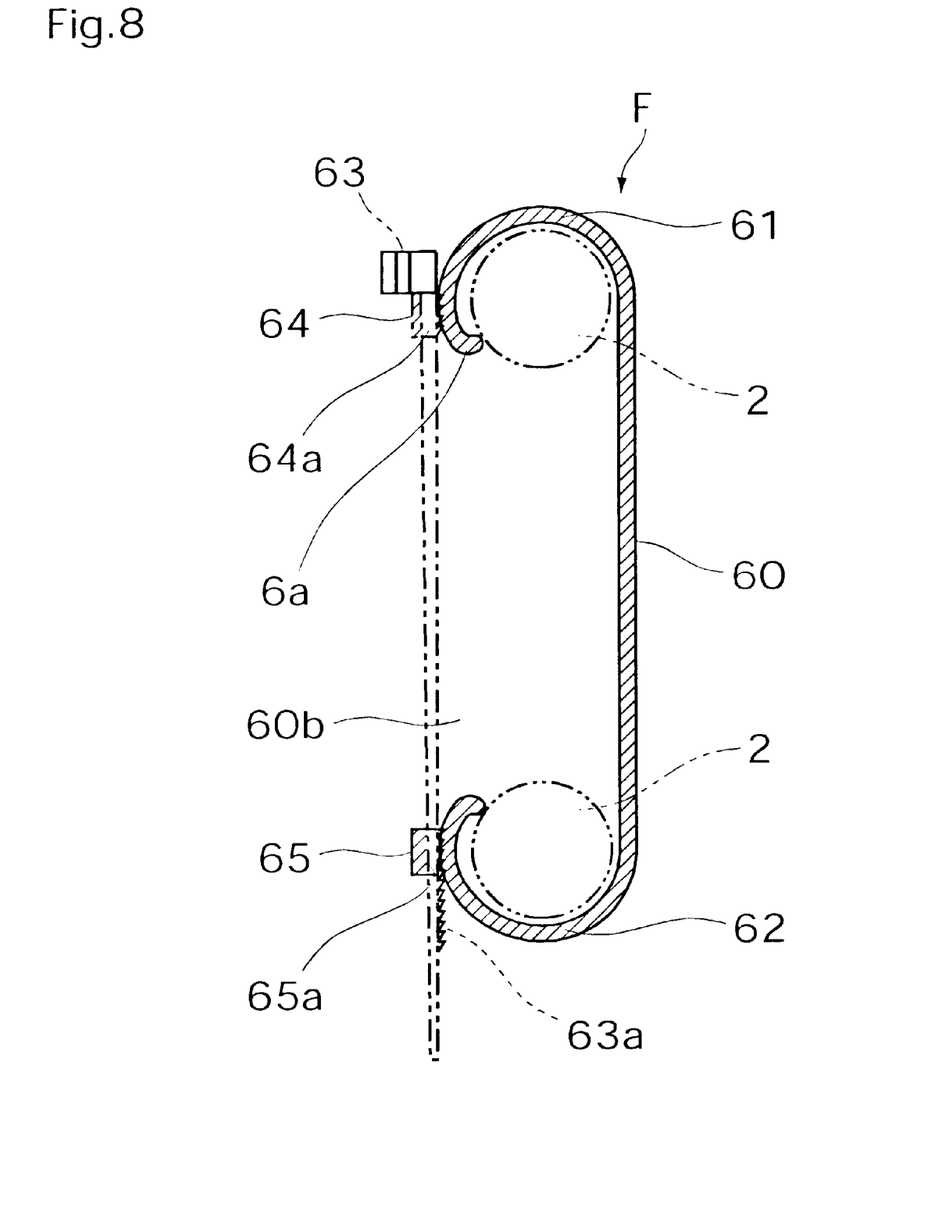
FIG. 8 is a cross-sectional view showing another embodiment of the fence chain indicator.
Figure 9:
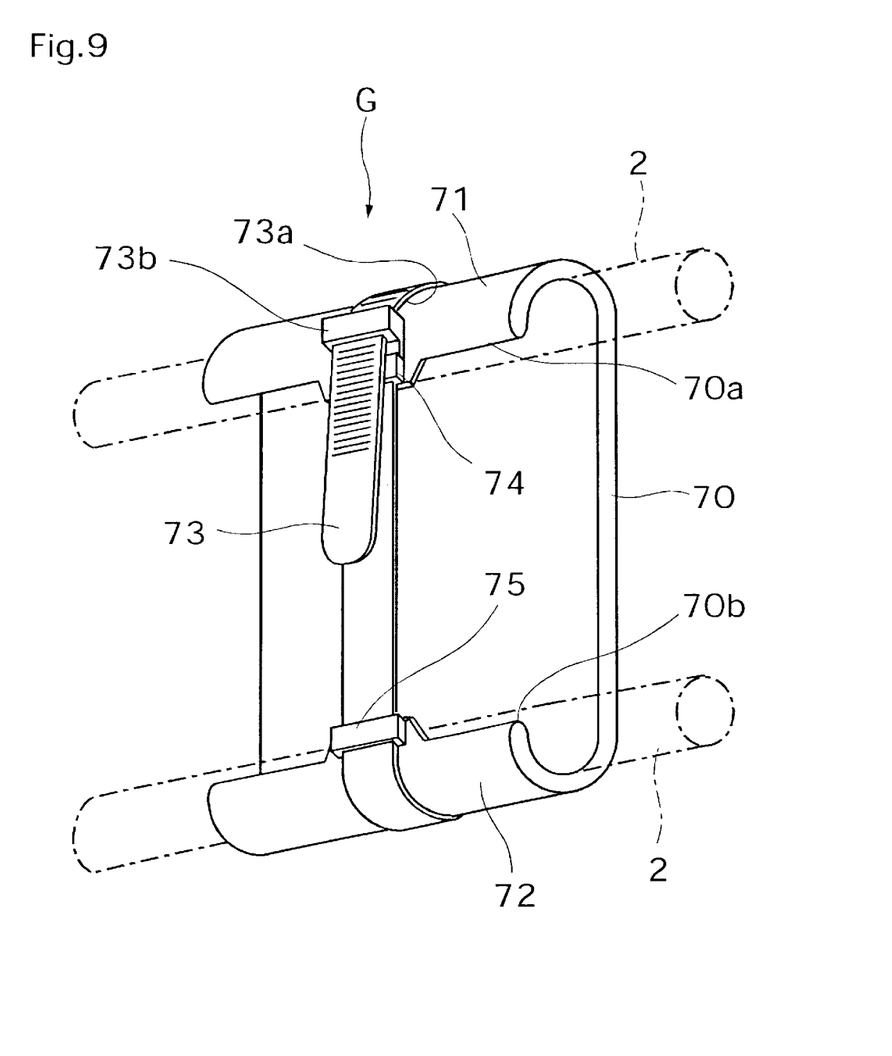
FIG. 9 is a perspective view showing another embodiment If the fence chain indicator.
Figure 10:
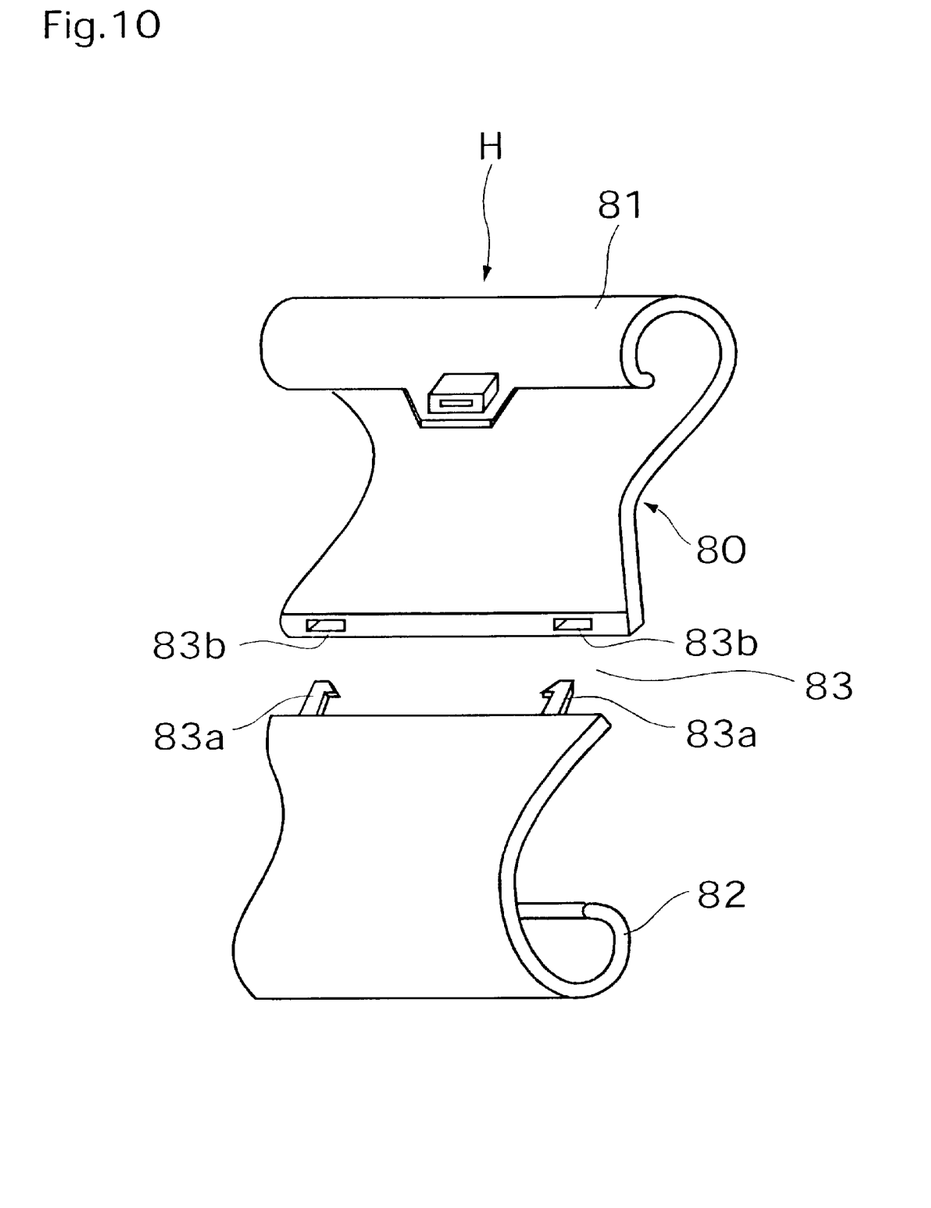
FIG. 10 is a perspective view showing another embodiment of the fence chain indicator.

FIG. 1 is a front view showing the state of utilization of a fence chain indicator of the present invention; FIG. 2 is a perspective view showing the fence chain indicator of FIG. 1; FIG. 3 is a cross-sectional view along Y—Y in FIG. 2; FIG. 4 is a perspective view showing another embodiment of the fence chain indicator; FIG. 5 is a perspective view showing another embodiment of the fence chain indicator; FIG. 6 is a perspective view showing another embodiment of the fence chain indicator; FIG. 7 is a perspective view showing another embodiment of the fence chain indicator; FIG. 8 is a cross-sectional view showing another embodiment of the fence chain indicator; FIG. 9 is a perspective view showing another embodiment of the fence chain indicator; and FIG. 10 is a perspective view showing another embodiment of the fence chain indicator.

A fence chain indicator A of the present invention, as shown in FIG. 1, is attached to a ring body 2 forming a fence chain 1, and fence chain 1 is made to a desired length by sequentially connecting ring bodies 2. Ring body 2 is formed to a predetermined size using a metal or molded plastic material, and the diameter and size of a ring body 2 is selected in accordance with the utilization venue and purpose. This fence chain indicator A is formed from a metallic material or a synthetic plastic material having flexibility, and enhances the visibility of a fence chain especially at night by using either a well-known luminous material or light-emitting device, or a well-known decorative illuminating material or a reflective material.

Further, fence chain indicator A, as shown in FIG. 2 and FIG. 3, comprises a rectangular sheet body 10 which has overall flexibility and is provided, at the opposite ends thereof 10a, 10b, with fastening portions 11, 12 which are formed into an approximate C shape. A fastening member 13 having engagement grooves 13a for locking is integrally attached to one end 10a of this sheet body 10, and a mating portion 14, which mates with the above-mentioned fastening member, is formed in the other end 10b. A through-hole 15 for fastening member 13 is formed in approximately the center portion of this sheet body 10. The open portions of fastening portions 11, 12 are opened in mutually opposite directions.

Further, that engagement grooves 13a of fastening member 13 are in the form wedges to be engaged with engagement grooves 14a which are formed in mating portion 14, and are angled in the direction of insertion so that once the fastening member 13 been inserted and engagement has been established between the engagement grooves, it cannot be removed. Engagement grooves 14a, which are formed in the mating hole of mating portion 14, are in the form of wedges similar to those of engagement grooves 13a, and are angled in the insertion direction so that once mating portion 14 has been inserted and engagement has been established, locking is achieved such that they do not come apart.

When using a fence chain indicator A constituted in this manner, approximate C-shaped fastening portion 11 is first fitted onto one side of ring body 2 using a snap function. Next, fastening portion 12 of the other side is fitted onto the opposite side of the ring body 2. In this case, even if the width dimension between ring bodies varies, these variances are absorbed by the fact that sheet body 10 has flexibility, as well as by the fact that the open positions of fastening portions 11, 12 shift. That is, when the width dimension between ring bodies is short, the open positions of fastening portions 11, 12 become closer, and when the width dimension between ring bodies is long, the open positions of fastening portions 11, 12 become farther apart. Further, since fastening portions 11, 12 also have flexibility, even if the diameters of ring bodies 2 differ, this can be handled by a single type of fence chain indicator A. Even in this state, fence chain indicator A will be fastened to ring body 2, but for more secure fastening, fastening member 13 is inserted through through-hole 15, and passed through the mating hole of mating portion 14, locking together engagement grooves 13a with engagement grooves 14a.

Since a fence chain indicator A, which is constituted as described hereinabove, either emits light or reflects light from automobiles and so forth at night as well, the existence of the fence chain 1 can be ascertained even from a distance, making it possible to prevent an accident in which a person or vehicle runs into a fence chain without noticing it. Further, even when there is variation in the width of ring bodies 2, since fence chain indicator A absorbs such variation, the indicator will not come off, and can be used even on ring bodies 2 of different sizes. And since both ends are tightly bound by fastening member 13, it is extremely difficult to remove fence chain indicator A from ring body 2, practically eliminating the danger of it being carried off.

Next, fence chain indicator B shown in FIG. 4 comprises a flexible sheet body 20 which is made from either a luminous material or a luminescent material and has open fastening portions 21, 22 formed at the opposite ends. A fastening member 23, provided with engagement grooves for locking, is integrally attached to one end 20a of the above-mentioned sheet body 20. In addition, a mating portion 24 for mating the engagement grooves is formed, and a through-hole 25 for the above-mentioned fastening member 23 is formed approximately in the center portion of the above-mentioned sheet body 20.

When using a fence chain indicator B constituted in this manner, either one side of the ring body 2 can be wrapped by open fastening portion 21, or fastening portion 21, which is formed in an approximate C shape, can be fitted onto one side of ring body 2 using the snap function. Next, fastening portion 22 of the other side is fitted onto the opposite side of ring body 2. Even in this state, fence chain indicator B is fastened to ring body 2 to some extent. For even more secure fastening, fastening member 23 is passed through through-hole 25, wrapped around the outside of fastening portion 22, once again passed through through-hole 25, and wrapped around the outside of fastening portion 21, locking together engagement grooves 23*a* with engagement grooves 24*a* of mating portion 24.

Since thus-constituted fence chain indicator B either emits light or reflects light from automobiles and so forth at night in the same manner as fence chain indicator A, the existence of the fence chain 1 can be ascertained even from a distance, making it possible to prevent an accident in which a person or vehicle runs into a fence chain 1 without noticing it. Further, even when there is variation in the width of ring bodies 2, since fence chain indicator B absorbs such variation, the indicator will not come off, and can be used even on ring bodies 2 of different sizes. And since fastening member 23 winds around and tightly binds both ends, it is extremely difficult to remove fence chain indicator B from ring body 2, practically eliminating the danger of it being carried off.

Next, fence chain indicator C shown in FIG. 5 comprises a flexible sheet body 30 which is made from either a luminous material or a luminescent material, and provided with open fastening portions 31, 32 formed at the opposite ends, and a fastening band 33 having a locking function separate from this sheet body 30. A through-hole 34 of fastening band 33 is formed in one end 30*a* of this sheet body 30, and a mating hole 35 for mating with the above-mentioned fastening band 33 is formed in the other end 30*b* of sheet body 30. Fastening band 33 is a commonly used band for binding, which has a well-known locking function.

When using a fence chain indicator C constituted in this manner, either one side of the ring body 2 can be wrapped by open fastening portion 31, or fastening portion 31, which is formed in an approximate C shape, can be fitted onto one side of ring body 2 using the snap function. Next, fastening portion 32 of the other side is fitted onto the opposite side of ring body 2. For even more secure fastening, fastening band 33, which is a separate body from sheet body 30, is passed through through-hole 35, and passes through mating portion 34, locking engagement grooves 33*a* with engagement grooves 34*a*.

Since thus-constituted fence chain indicator C, either emits light or reflects light from automobiles and so forth at night in the same manner as fence chain indicator A and fence chain indicator B, the existence of the fence chain 1 can be ascertained even from a distance, making it possible to prevent an accident in which a person or vehicle runs into a fence chain 1 without noticing it. Further, even when there is variation in the width of ring bodies 2, since fence chain indicator C absorbs such variation, the the indicator will not come off, and can be used even on ring bodies 2 of different sizes.

Next, fence chain indicator D shown in FIG. 6 comprises a flexible sheet body 40 which is made from either a luminous material or a luminescent material and has open fastening portions 41, 42 formed at the opposite ends thereof, and a flexible fastening member 43, which are provided with engagement grooves for locking and are integrally attached to one end 40*a* of the above-mentioned sheet body 40. A mating portion 44 for mating with the above-mentioned fastening member 43 is formed at the other end 40*b*, and the C-shaped openings of the above-mentioned fastening portions 41, 42 are opened in the same direction.

When using a fence chain indicator D constituted in this manner, either one side of the ring body 2 can be wrapped by open fastening portion 41, or fastening portion 41, which is formed in an approximate C shape, can be fitted onto one side of ring body 2 using the snap function. Next, fastening portion 42 of the other side is fitted onto the opposite side of ring body 2. Even in this state, fence chain indicator D is fastened to ring body 2 to some extent, and for even more secure fastening, fastening member 43 passes through mating portion 44, locking engagement grooves 43*a* together with engagement grooves 44*a*.

Since fence chain indicator D thus constituted either emits light or reflects light from automobiles and so forth at night in the same manner as fence chain indicator A and fence chain indicator B, the existence of the fence chain 1 can be ascertained even from a distance, making it possible to prevent an accident in which a person or vehicle runs into a fence chain 1 without noticing it. Further, even when there is variation in the width of ring bodies 2, since fence chain indicator D absorbs such variation, the indicator will not come off, and can be used even on ring bodies 2 of different sizes.

Next, fence chain indicator E shown in FIG. 7 comprises a flexible sheet body 50 which is made from either a luminous material or a luminescent material and has open fastening portions 51, 52 formed at the opposite ends thereof, and a fastening band 53 having a locking function separate from the above-mentioned sheet body 50. An inserting portion 54 of the above-mentioned fastening band 53 is formed in one end 50*a* of the above-mentioned sheet body 50, and a mating portion 55 for mating with the above-mentioned fastening band 53 is formed in the other end 50*b* of the above-mentioned sheet body 50, and the open portions of the above-mentioned fastening portions 51, 52 are opened in the same direction.

When using a fence chain indicator E constituted in this manner, either one side of the ring body 2 can be wrapped by open fastening portion 51, or fastening portion 51, which is formed in an approximate C shape, can be fitted onto one side of ring body 2 using the snap function. Next, fastening portion 52 of the other side is fitted onto the opposite side of ring body 2. For even more secure fastening, fastening member 53 passes through inserting portion 54, and engagement grooves 53*a* of the locking function are inserted into mating portion 55, locking together with engagement grooves 55*a*.

Since thus-constituted fence chain indicator E either emits light or reflects light from automobiles and so forth at night in the same manner as fence chain indicator A and fence chain indicator B, the existence of the fence chain 1 can be ascertained even from a distance, making it possible to prevent an accident in which a person or vehicle runs into a fence chain 1 without noticing it. Further, even when there is variation in the width of ring bodies 2, since fence chain indicator E absorbs such variation, the indicator will not come off, and can be used even on ring bodies 2 of different sizes.

Further, fence chain indicator F shown in FIG. 8 is constituted from a flexible sheet body 60 which is made from either a luminous material or a luminescent material and has open fastening portions 61, 62 formed at the opposite ends, end a fastening band 63 having a locking function separate from the above-mentioned sheet body 60. An inserting portion 64 of the above-mentioned fastening band 63 is formed in one end 60a of this sheet body, and a mating portion 65 for mating with the above-mentioned fastening band 63 is formed in the other end 60b of the above-mentioned sheet body 60. Then, engagement grooves 64a are formed in inserting portion 64, and engagement grooves 65a for mating with engagement grooves 63a of fastening band 63 are also formed in mating portion 65.

When using a fence chain indicator F constituted in this manner, fastening band 63 is passed through inserting portion 64, and fastened by mating engagement grooves 63a with engagement grooves 65a of mating portion 65. Since engagement grooves 64a of inserting portion 64 are grooves, which are angled in the direction of insertion, engagement grooves 63a of fastening band 63 can also pass through in the direction of insertion.

Further, fence chain indicator G shown in FIG. 9 is constituted from a flexible sheet body 70 which is made from either a luminous material or a luminescent material and has open fastening portions 71, 72 formed at the opposite ends, and a fastening band 73 comprising a locking function separate from the above-mentioned sheet body 70. This fastening band 73 is a commercially available well-known band having engagement grooves 73a and mating portion 73b for mating with these grooves 73a. An inserting portion 74 having no engagement grooves is formed in one end 70a of this sheet body so that fastening band 73 is passed through, and a mating portion 75 having no engagement grooves is formed in the other end 70b of sheet body 70, so that fastening band 73 is passed through.

When using a fence chain indicator G constituted in this manner, fastening band 73 is passed through inserting portion 74 and mating portion 75, wrapped around fastening portions 71, 72, and fastened by inserting engagement grooves 73a into mating portion 73b.

In addition, fence chain indicator H shown in FIG. 10 comprises a flexible sheet body 80 which is made from either a luminous material or a luminescent material and has open fastening portions 81, 82 formed in the opposite ends thereof. The sheet body 80 has a joining portion 83 disposed in the approximate center portion, so that it can be separated in the vertical direction. Consequently, two male mating portions 83a, 83a and two female mating portions 83b, 83b are formed in joining portion 83. Male mating portions 83a comprise wedge-shaped locking flanges at their tips, and are constituted so as to be able to mate with female mating portions 83b.

Since sheet body 80 of fence chain indicator H thus constituted can be separated into two at joining portion 83, attaching same to a ring body is simple, and since joining the two halves of sheet body 80 together can be done using a one-touch operation, convenience is enhanced.

As explained hereinabove, a fence chain indicator related to the present invention comprises a flexible sheet body which is made from either a luminous material or a luminescent material and has open fastening portions formed at the opposite ends, a fastening member which is provided with engagement grooves for locking and is integrally attached to one end of the above-mentioned sheet body, a mating portion for mating with the above-mentioned fastening member formed in the other end of the above-mentioned sheet body, and a through-hole for the above-mentioned fastening member formed in the approximate center portion of the above-mentioned sheet body, and as a merit of such constitution the fence chain indicator exhibits the outstanding effect of making it possible to ascertain the existence of a fence chain even at a distance, thus preventing an accident in which a person or vehicle runs into a fence chain without noticing it, because light is either emitted, or light from an automobile or the like is reflected by the indicator at night.

Further, because a fence chain indicator comprises flexibility, fence chain indicator absorbs possible variation in the size and width dimensions of ring bodies 2, and therefore the indicator will not come off, and can be used even on ring bodies 2 of different sizes. Furthermore, a fence chain indicator related to the present invention also exhibits the effect of preventing theft, by practically eliminating the risk of it being carried off since both ends are tightly bound by a fastening member 13, making it extremely difficult to remove fence chain indicator A from ring body 2.

What is claimed is:

1. A fence chain indicator, comprising a sheet body which has flexibility and is provided with fastening portions, which are opened, at the opposite ends thereof, and wherein:
   a fastening member which is provided with engagement grooves for locking, is integrally attached to one end of the sheet body;
   a mating portion is formed at the other end of aid sheet body to mate with said fastening member; and
   a through-hole for said fastening member is formed in the approximate center portion of said sheet body.

2. A fence chain indicator, comprising a sheet body which is provided with fastening portions, which are opened, at the opposite ends thereof, and wherein:
   a fastening member which is provided with engagement grooves for locking is integrally attached to, and a mating portion for mating with said fastening member is formed at one end of said sheet body; and
   a through-hole for said fastening member is formed in the approximate center of said sheet body.

3. A fence chain indicator, comprising:
   a sheet body which has flexibility and is provided with fastening portions, which are opened, at the opposite ends thereof; and
   a fastening band having a locking function that is provided separately from said sheet body, and wherein:
   an inserting hole for said fastening band is formed in one end of said sheet body;
   a mating portion for mating with said fastening band is formed in the other end of said sheet body; and
   a through-hole for said fastening member is formed in the approximate center of said sheet body.

4. The fence chain indicator according to any one of claims 1 through 3, wherein the openings of said fastening portions are mutually opened in opposite directions.

5. A fence chain indicator, comprising a sheet body, which has flexibility and is provided with fastening portions, which are opened, at the opposite ends thereof, and wherein:
   a fastening member, which has flexibility and is provided with engagement grooves for locking, is integrally attached to one end of said sheet body;
   a mating portion for mating to said fastening member is formed at the other end of said sheet body; and
   the openings of said fastening portions are opened in the same direction.

6. A fence chain indicator, comprising:
   a sheet body which has flexibility and is provided with fastening portions, which are opened, at the opposite ends thereof; and a fastening band having a locking function that is provided separately from said sheet body, and wherein:
an inserting portion for said fastening band is formed in one end of said sheet body;
a mating portion for mating with said fastening band is formed in the other end of said sheet body; and
the openings of said fastening portions are opened in the same direction.

7. The fence chain indicator according to any one of claims 1–3, 5 and 6, wherein said sheet body is made from either a luminous material or a luminescent material.

8. The fence chain indicator according to any one of claims 1–3, 5 and 6, wherein said fastening portions provided at the opposite ends are formed in an approximate C shape, and have snap functions.

9. The fence chain indicator according to either claim 3 or claim 6, wherein said fastening portions at the opposite ends are provided with mating portions for mating with said fastening band.

10. The fence chain indicator according to either claim 3 or claim 6, wherein said fastening portions at the opposite ends are provided with inserting portions through which said fastening band passes.

11. The fence chain indicator according to any one of claims 1–3, 5 and 6, wherein a joining portion is provided in the approximate center of said sheet body, and said sheet body is constituted so as to be able to separate in the vertical direction from the joining portion.

12. The fence chain indicator according to claim 11, wherein male mating portions and female mating portions are formed at said joining portion.

* * * * *